United States Patent
Kajino et al.

(10) Patent No.: US 11,682,986 B2
(45) Date of Patent: Jun. 20, 2023

(54) PIEZOELECTRIC DRIVE DEVICE AND ROBOT

(71) Applicant: SEIKO EPSON CORPORATION, Tokyo (JP)

(72) Inventors: Kiichi Kajino, Matsumoto (JP); Tomoaki Takahashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 17/510,408

(22) Filed: Oct. 26, 2021

(65) Prior Publication Data

US 2022/0131481 A1 Apr. 28, 2022

(30) Foreign Application Priority Data

Oct. 27, 2020 (JP) .............................. JP2020-179519

(51) Int. Cl.
*H02N 2/10* (2006.01)
*B25J 9/12* (2006.01)

(52) U.S. Cl.
CPC .............. *H02N 2/103* (2013.01); *B25J 9/126* (2013.01)

(58) Field of Classification Search
CPC .............. H02N 2/103; B25J 9/126; B25J 9/12
See application file for complete search history.

(56) References Cited

U.S. PATENT DOCUMENTS 7,342,347 B2 * 3/2008 Magnussen .......... H02N 2/0065
310/323.01

FOREIGN PATENT DOCUMENTS

JP 2001346386 A 12/2001

* cited by examiner

*Primary Examiner* — Emily P Pham
(74) *Attorney, Agent, or Firm* — Yu Gang

(57) ABSTRACT

A piezoelectric drive device includes a substrate, a convex portion coupling to the substrate and transmitting drive power to a driven member, first drive piezoelectric elements placed on the substrate and vibrating the substrate in Y directions in which the substrate and the convex portion are arranged, second drive piezoelectric elements placed on the substrate and vibrating the substrate in Z directions orthogonal to the Y directions, a reference piezoelectric element placed on the substrate, receiving the vibration in the Y directions, and outputting a detection signal, and a concave portion placed side by side with the reference piezoelectric element in the Z directions in a plan view from an X direction orthogonal to the Y directions and the Z directions.

10 Claims, 18 Drawing Sheets

PIEZOELECTRIC DRIVE DEVICE AND ROBOT

The present application is based on, and claims priority from JP Application Serial Number 2020-179519, filed Oct. 27, 2020, the disclosure of which is hereby incorporated by reference herein in its entirety.

BACKGROUND

1. Technical Field

The present disclosure relates to a piezoelectric drive device and a robot.

2. Related Art

Recently, a vibration actuator using vibration of a piezoelectric element has been developed and used as a drive device for a piezoelectric motor. As the vibration actuator, for example, in JP-A-2001-346386, a plurality of drive electrodes are provided on front and back surfaces of an electromechanical transducer element as a piezoelectric element and symmetrical stretching vibration and in-plane flexural vibration are performed, and thereby, elliptic motion to rotate a rotor is generated. Further, a vibration detection electrode is provided on the front surface of the electromechanical transducer element, and thereby, vibration of the electromechanical transducer element is detected and the electromechanical transducer element is efficiently driven.

However, in the vibration actuator disclosed in JP-A-2001-346386, the vibration detection electrode detects a signal in which the symmetrical stretching vibration and the in-plane flexural vibration are superimposed, and there is a problem that accurate detection of a signal of symmetrical stretching vibration is difficult.

SUMMARY

A piezoelectric drive device includes a substrate, a convex portion coupling to the substrate and transmitting drive power to a driven member, a first drive piezoelectric element placed on the substrate and vibrating the substrate in first directions in which the substrate and the convex portion are arranged, a second drive piezoelectric element placed on the substrate and vibrating the substrate in second directions orthogonal to the first directions, a reference piezoelectric element placed on the substrate, receiving the vibration in the first directions, and outputting a detection signal, and a concave portion placed side by side with the reference piezoelectric element in the second directions in a plan view from a third direction orthogonal to the first directions and the second directions.

A robot includes a piezoelectric motor having the above described piezoelectric drive device.

DESCRIPTION OF EXEMPLARY EMBODIMENTS

1. First Embodiment

First, a piezoelectric drive device 3 according to a first embodiment will be explained using a piezoelectric motor 1 including the piezoelectric drive device 3 as an example with reference to FIGS. 1 to 5.

Figure 2:
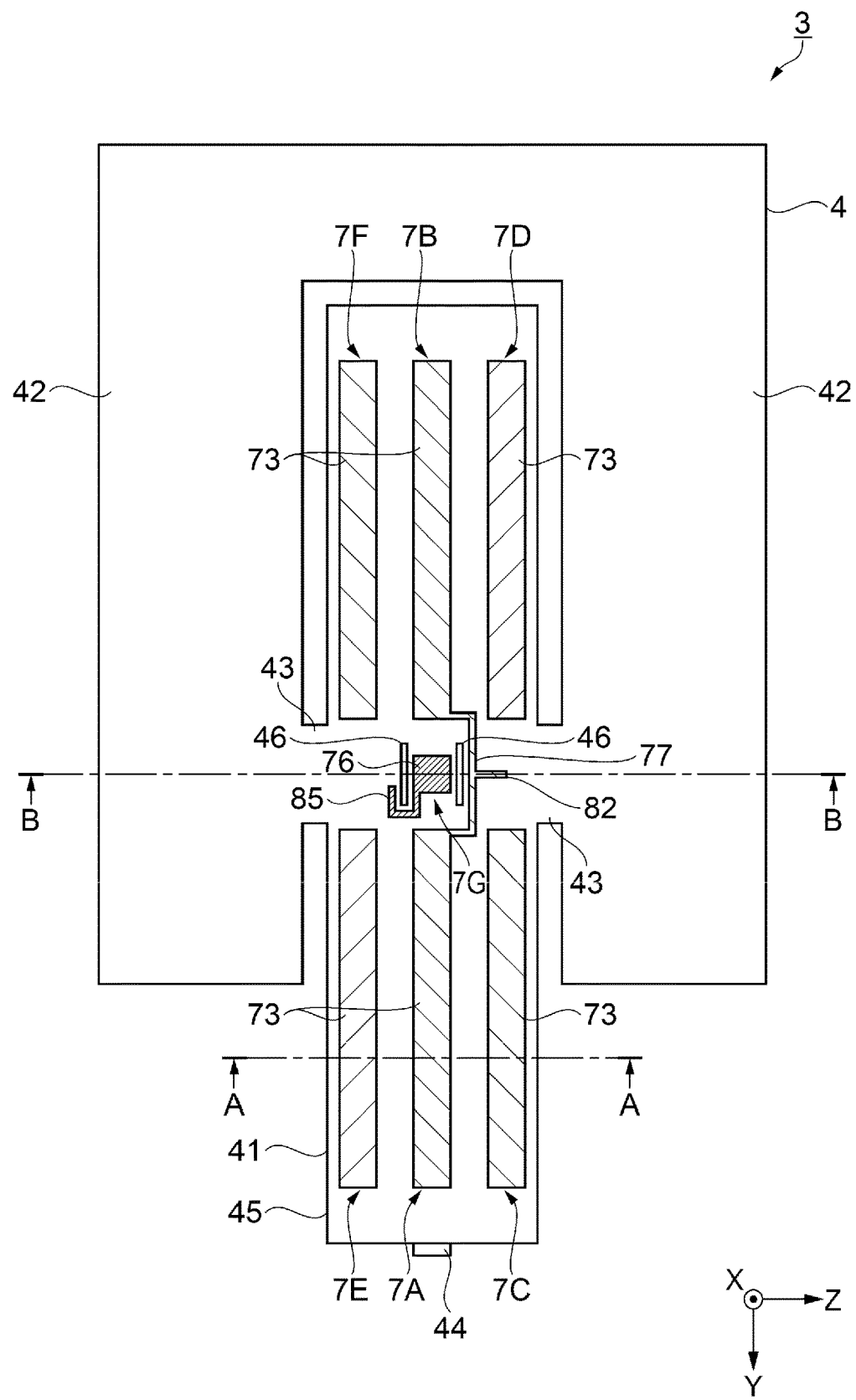
FIG. 2 is a plan view showing placement of electrodes in the piezoelectric drive device according to the first embodiment.
Figure 3:
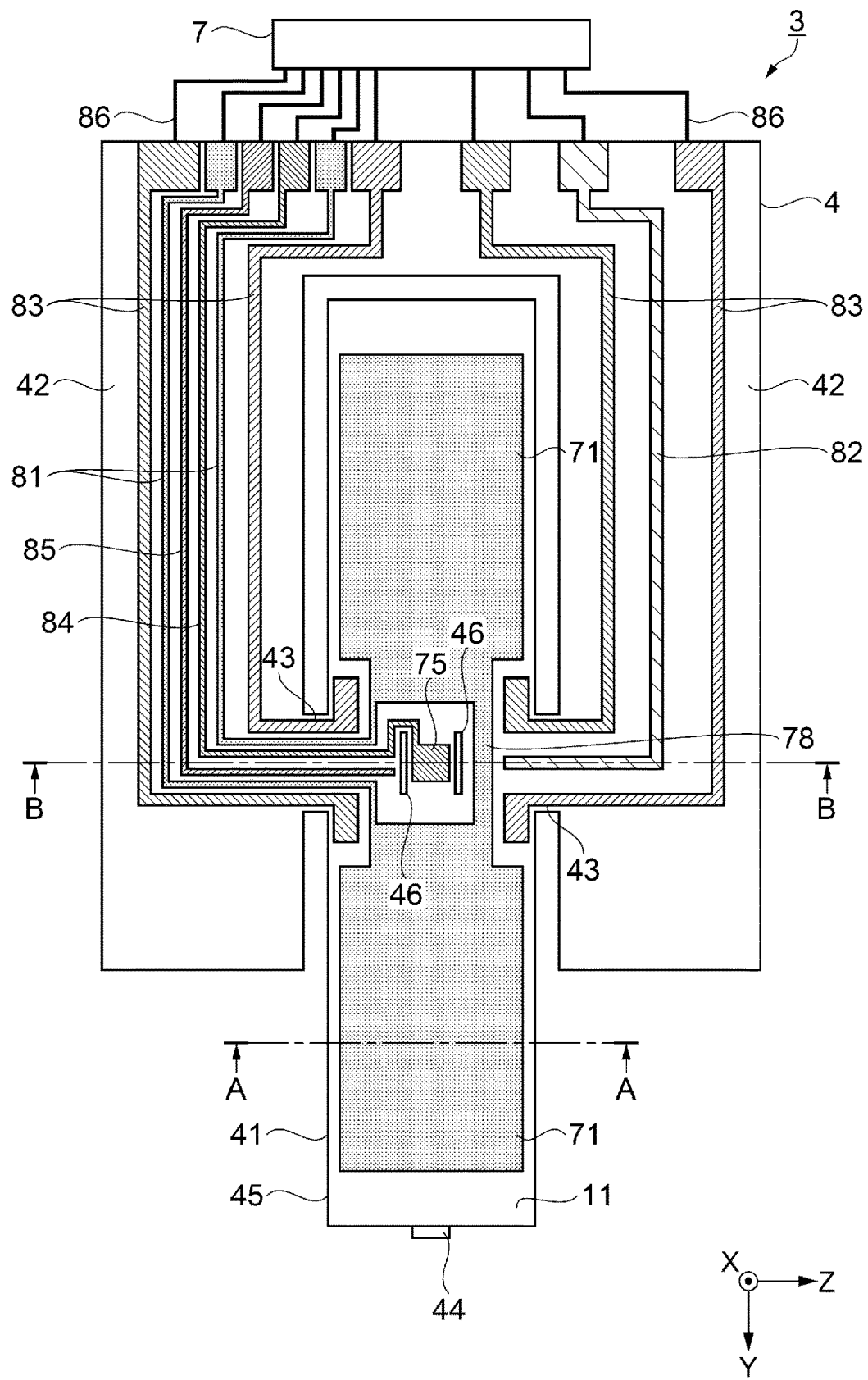
FIG. 3 is a plan view showing placement of wires in the piezoelectric drive device according to the first embodiment.

For convenience of explanation, in FIG. 2, illustration of protective layers 74 on the top and wires shown in FIG. 3 is omitted. Further, in the subsequent respective drawings, as three axes orthogonal to one another, an X-axis, a Y-axis, and a Z-axis are shown. Further, directions along the X-axis are referred to as "X directions", directions along the Y-axis are referred to as "Y directions", and directions along the Z-axis are referred to as "Z directions". Furthermore, the arrow-head sides of the respective axes are also referred to as "plus sides", the opposite sides to the arrow-heads are also referred to as "minus sides", the plus side in the X direction is also referred to as "upper", and the minus side in the X direction is also referred to as "lower". First directions in the embodiment are the Y directions, second directions are the Z directions, and third directions are the X directions.

Figure 1:
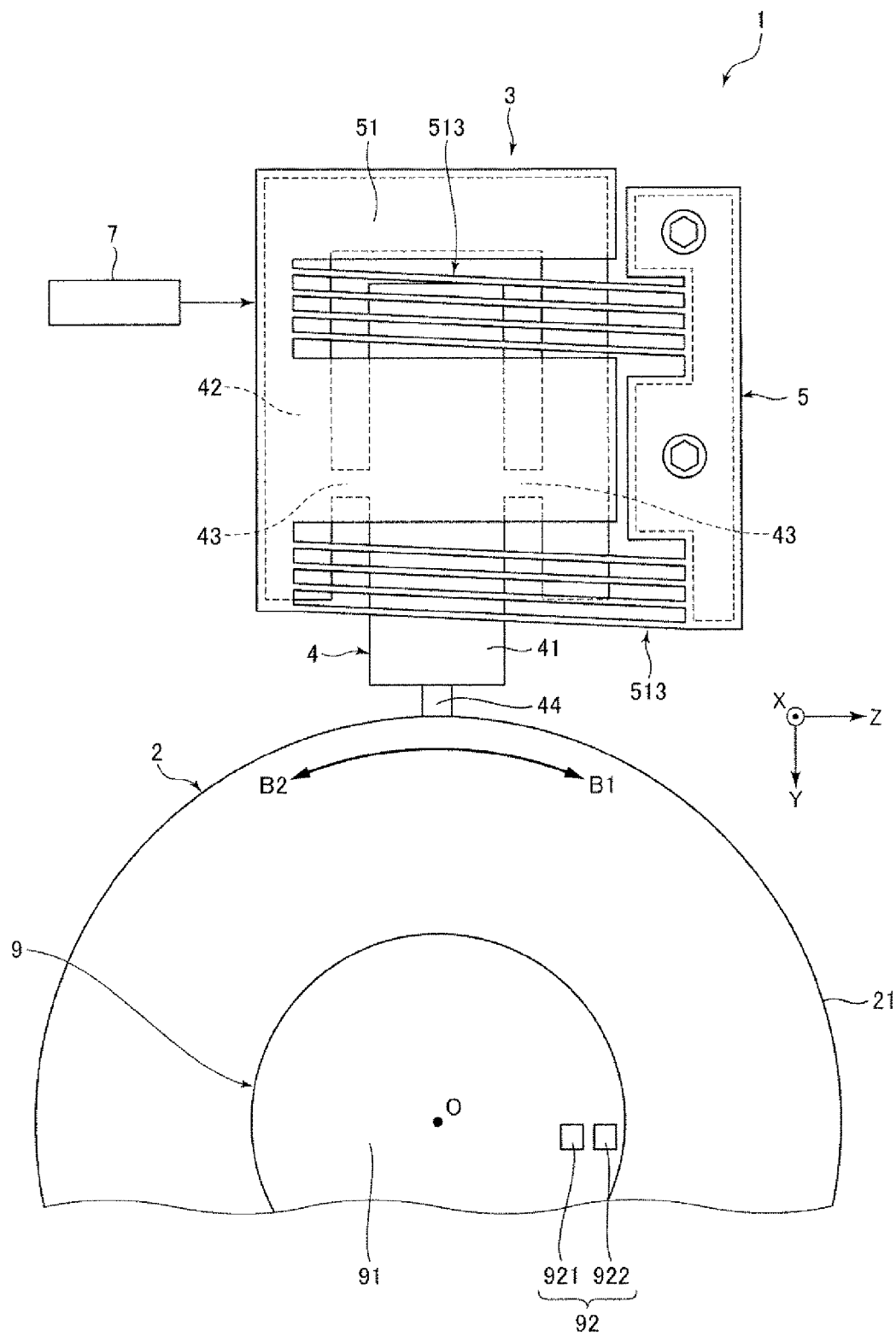
FIG. 1 is a plan view showing a schematic configuration of a piezoelectric motor including a piezoelectric drive device according to a first embodiment.

As shown in FIG. 1, the piezoelectric motor 1 has a rotor 2 in a disk shape as a driven member rotatable around a rotation axis O thereof, and the piezoelectric drive device 3 in contact with an outer circumferential surface 21 of the rotor 2. In the piezoelectric motor 1, when the piezoelectric drive device 3 is flexurally vibrated, the rotor 2 rotates around the rotation axis O parallel to the X-axis.

Further, an encoder 9 is provided in the rotor 2 and behavior, particularly, a rotation amount and an angular velocity of the rotor 2 may be detected by the encoder 9. The encoder 9 has a scale 91 fixed to the upper surface of the rotor 2 and an optical element 92 provided on the upside of the scale 91. Further, the scale 91 has a disk shape with a pattern (not shown) provided on the upper surface thereof. On the other hand, the optical element 92 has a light emitting device 921 that radiates light toward the pattern of the scale 91 and an imaging device 922 that images the pattern of the scale 91. In the encoder 9 having the above described configuration, the rotation amount, a drive velocity, an absolute position, etc. of the rotor 2 may be detected by template matching of an image of the pattern acquired by the imaging device 922.

The piezoelectric drive device 3 of the embodiment has a piezoelectric actuator 4 that vibrates, an urging member 5 that urges the piezoelectric actuator 4 toward the rotor 2, and a controller 7 that controls driving of the piezoelectric actuator 4.

The piezoelectric actuator 4 has a vibrator 41, supporting portions 42 supporting the vibrator 41, coupling portions 43 coupling the vibrator 41 and the supporting portions 42, and a convex portion 44 transmitting drive power to the rotor 2 as the driven member.

As shown in FIG. 2, the vibrator 41 has a plate-like shape spreading on the YZ-plane containing the Y-axis and the Z-axis having a thickness in the X directions, and flexurally vibrates in S shapes by bending in the Z directions while expanding and contracting in the Y directions. Further, the vibrator 41 has a rectangular shape elongated in the Y directions as the expansion and contraction directions in a plan view from the X direction.

The vibrator 41 has a substrate 45, first drive piezoelectric elements 7A, 7B placed on the substrate 45 and vibrating the substrate 45 in the Y directions in which the substrate 45 and the convex portion 44 are arranged, second drive piezoelectric elements 7C, 7D, 7E, 7F placed on the substrate 45 and vibrating the substrate 45 in the Z directions, and a reference piezoelectric element 7G placed on the substrate 45 and receiving the vibration in the Y directions and outputting a detection signal.

The first drive piezoelectric elements 7A, 7B are arranged in the Y directions of the substrate 45 in the center part in the Z directions of the substrate 45. At the plus side in the Z direction of the substrate 45 with respect to the first drive piezoelectric elements 7A, 7B, the second drive piezoelectric elements 7C, 7D are arranged in the Y directions of the substrate 45 and, at the minus side in the Z direction, the second drive piezoelectric elements 7E, 7F are arranged in the Y directions of the substrate 45.

The reference piezoelectric element 7G is placed between the first drive piezoelectric element 7A and the first drive piezoelectric element 7B in the center part in the Y directions and the Z directions of the substrate 45. Further, on the substrate 45, concave portions 46 are placed side by side with the reference piezoelectric element 7G in the Z directions in the plan view from the X direction as a thickness direction of the substrate 45. Note that, in the embodiment, the two concave portions 46 are placed at the plus side and the minus side in the Z direction with the reference piezoelectric element 7G in between. That is, the reference piezoelectric element 7G is placed between the two concave portions 46 in the plan view from the X direction.

The supporting portions 42 support the substrate 45 to be the vibrator 41 via the coupling portions 43. The supporting portions 42 have a U-shape surrounding the minus side in the Y direction of the vibrator 41 in the plan view from the X direction. The coupling portions 43 couple a part as a node of the flexural vibration of the vibrator 41, specifically, the center part in the Y directions of the vibrator 41 and the supporting portions 42.

On the supporting portions 42 and the coupling portions 43, as shown in FIG. 3, reference potential wires 81, a first drive wire 82, second drive wires 83, a first detection wire 84, and a second detection wire 85 are placed.

One ends of the reference potential wires 81 are electrically coupled to first electrodes 71 provided on a first surface 11 of the substrate 45, and the other ends of the reference potential wires 81 are electrically coupled to the controller 7 via external wires 86. Note that the first electrode 71 provided at the plus side in the Y direction of the substrate 45 and the first electrode 71 provided at the minus side in the Y direction of the substrate 45 are electrically coupled by a coupling electrode 78.

One end of the first drive wire 82 is electrically coupled to second electrodes 73 shown in FIG. 2 to be drive electrodes for the first drive piezoelectric elements 7A, 7B via penetrating electrodes (not shown) provided in the protective layer 74, and the other end of the first drive wire 82 is electrically coupled to the controller 7 via the external wire 86. Note that the second electrode 73 of the first drive piezoelectric element 7A and the second electrode 73 of the first drive piezoelectric element 7B are electrically coupled by a coupling electrode 77 as shown in FIG. 2 and electrically coupled to the first drive wire 82 via the coupling electrode 77.

One ends of the second drive wires 83 are electrically coupled to the second electrodes 73 shown in FIG. 2 to be drive electrodes for the second drive piezoelectric elements 7C, 7D, 7E, 7F via penetrating electrodes (not shown) provided in the protective layer 74, and the other ends of the second drive wires 83 are electrically coupled to the controller 7 via the external wires 86.

One end of the first detection wire 84 is electrically coupled to a third electrode 75 provided on the first surface 11 of the substrate 45 to be a detection electrode for the reference piezoelectric element 7G, and the other end of the first detection wire 84 is electrically coupled to the controller 7 via the external wire 86.

One end of the second detection wire 85 is electrically coupled to a fourth electrode 76 shown in FIG. 2 to be a detection electrode for the reference piezoelectric element 7G via a penetrating electrode (not shown) provided in the protective layer 74, and the other end of the second detection wire 85 is electrically coupled to the controller 7 via the external wire 86.

Figure 4:
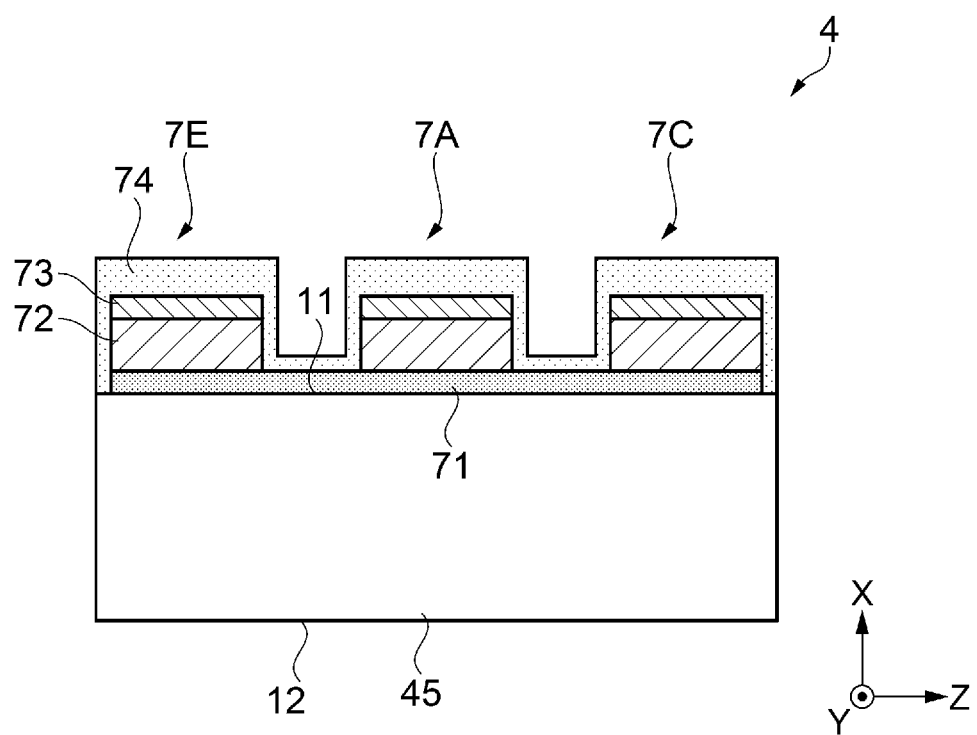
FIG. 4 is a sectional view along line A-A in FIGS. 2 and 3.

As shown in FIG. 4, each of the first drive piezoelectric element 7A, the second drive piezoelectric element 7C, and the second drive piezoelectric element 7E has the first electrode 71 placed on the first surface 11 of the substrate 45, a piezoelectric material 72 placed on the first electrode 71, and the second electrode 73 placed on the piezoelectric material 72. Note that the protective layers 74 for preventing short circuit between the electrodes are provided on the second electrodes 73 and the respective wires shown in FIG. 3. Further, the first drive piezoelectric element 7B, the second drive piezoelectric element 7D, and the second drive piezoelectric element 7F have the same configurations. As shown in FIG. 3, the first electrode 71 is common to the first drive piezoelectric elements 7A, 7B and the second drive piezoelectric elements 7C, 7D, 7E, 7F, however, the piezoelectric materials 72 and the second electrodes 73 are respectively individually provided in the first drive piezoelectric elements 7A, 7B and the second drive piezoelectric elements 7C, 7D, 7E, 7F.

Figure 5:
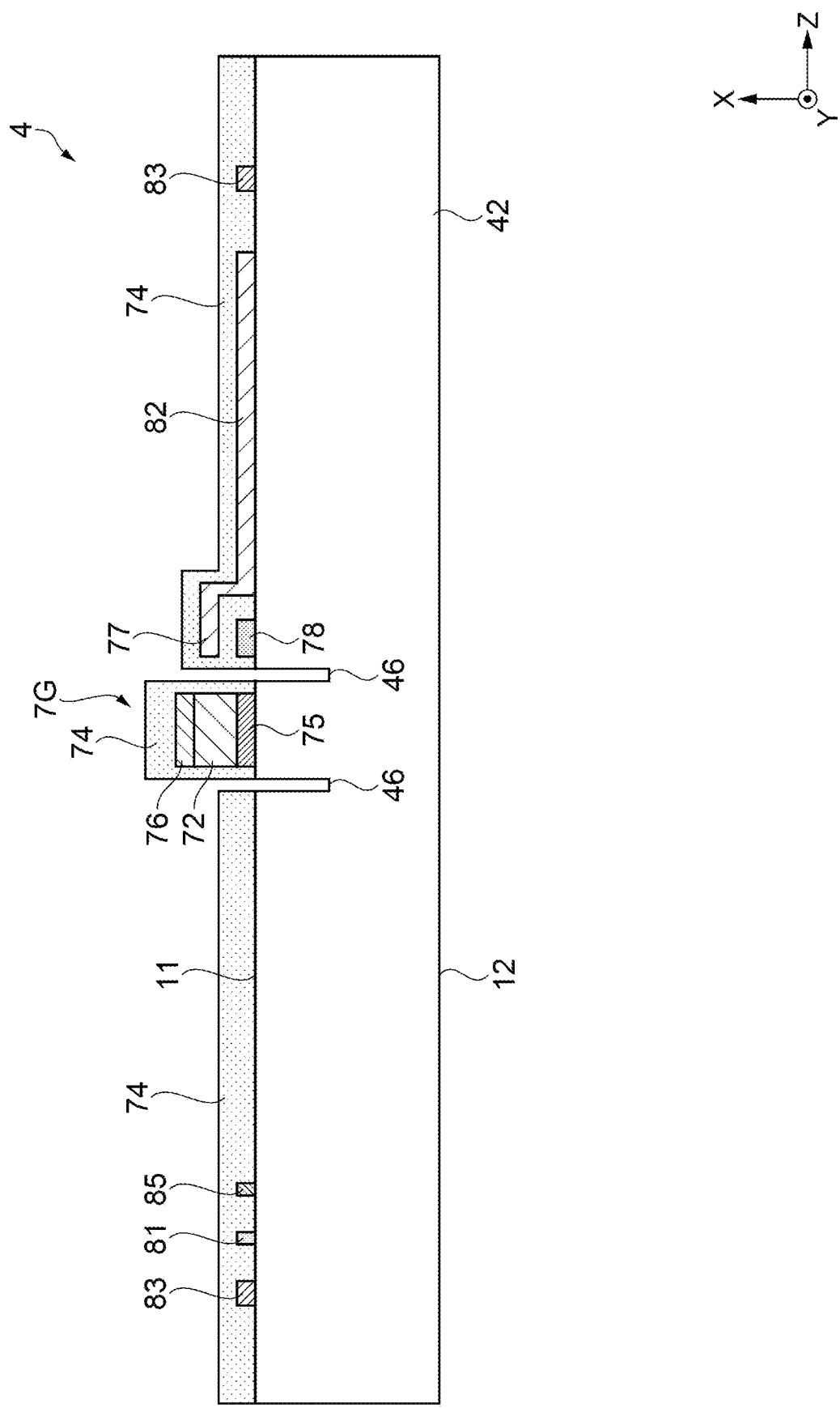
FIG. 5 is a sectional view along line B-B in FIGS. 2 and 3.

As shown in FIG. 5, the reference piezoelectric element 7G has the third electrode 75 placed on the first surface 11 of the substrate 45, the piezoelectric material 72 placed on the third electrode 75, and the fourth electrode 76 placed on the piezoelectric material 72. The third electrode 75 is individually provided from the first electrode 71 and the fourth electrode 76 is individually provided from the second electrode 73. That is, the third electrode 75 and the fourth electrode 76 are detection electrodes that output a detection signal according to the vibration of the piezoelectric material 72 of the reference piezoelectric element 7G to the controller 7. Further, the protective layer 74 is provided on the fourth electrode 76. Note that the concave portions 46 provided on both sides in the Z directions of the reference piezoelectric element 7G are placed on the first surface 11 as the surface on which the reference piezoelectric element 7G of the substrate 45 is placed, opens to the first surface 11 side of the substrate 45, and has a bottom surface at a second surface 12 side of the substrate 45.

The constituent material of the piezoelectric material 72 is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate may be used. As the piezoelectric material 72, not only the above described piezoelectric ceramics but also polyvinylidene fluoride, quartz crystal, or the like may be used.

The method of forming the piezoelectric material 72 is not particularly limited, but the material may be formed from a bulk material or using the sol-gel method or sputtering method.

As the constituent material of the substrate 45, silicon having higher processing accuracy may be used in formation of the outer shape of the vibrator 41, formation of the concave portions 46, etc.

When alternating-current voltages are applied, the first drive piezoelectric elements 7A, 7B longitudinally vibrate to expand and contract the substrate 45 in the Y directions. Like the first drive piezoelectric elements 7A, 7B, when alternating-current voltages are applied, the second drive piezoelectric elements 7C, 7D, 7E, 7F longitudinally vibrate to expand and contract the substrate 45 in the Y directions.

Accordingly, the second drive piezoelectric element 7C and the second drive piezoelectric element 7F are electrically coupled, the second drive piezoelectric element 7D and the second drive piezoelectric element 7E are electrically coupled, and alternating-current voltages at the same frequency with different phases are respectively applied to the second drive piezoelectric elements 7C, 7F and the second drive piezoelectric elements 7D, 7E. Thereby, when the second drive piezoelectric elements 7C, 7F expand in the Y directions, the second drive piezoelectric elements 7D, 7E contract in the Y directions, and, when the second drive piezoelectric elements 7C, 7F contract in the Y directions, the second drive piezoelectric elements 7D, 7E expand in the Y directions. Therefore, the substrate 45 may be flexurally vibrated in S shapes within the plane. Thus, the alternating-current voltages with different phases are respectively applied to the first drive piezoelectric elements 7A, 7B and the second drive piezoelectric elements 7C, 7D, 7E, 7F, and thereby, the vibrator 41 longitudinally vibrates in the Y directions and flexurally vibrates in the S shapes in the Z directions, these vibrations are synthesized, and the distal end of the convex portion 44 makes an elliptic motion tracing an elliptic trajectory.

When receiving an external force according to the vibration including the longitudinal vibration, the flexural vibration, etc. of the vibrator 41 with driving of the first drive piezoelectric elements 7A, 7B and the second drive piezoelectric elements 7C, 7D, 7E, 7F, the reference piezoelectric element 7G outputs a detection signal according to the received external force. Accordingly, the vibration state of the vibrator 41 may be sensed based on the detection signal output from the reference piezoelectric element 7G.

In the embodiment, to accurately sense the vibration state of the longitudinal vibration as the vibration in the Y directions, the concave portions 46 are placed side by side with the reference piezoelectric element 7G in the Z directions. Accordingly, the flexural vibration as the vibration in the Z directions of the vibrator 41 becomes harder to be transmitted to the reference piezoelectric element 7G and sensitivity to the flexural vibration becomes lower, and thereby, the longitudinal vibration as the vibration in the Y directions of the vibrator 41 may be accurately detected. Further, as shown in FIGS. 2 and 3, the length in the Y directions of the concave portion 46 is longer than the length in the Y directions of the reference piezoelectric element 7G, and thereby, the influence by the flexural vibration may be further reduced.

The convex portion 44 is provided in the distal end part of the vibrator 41 and projects from the vibrator 41 toward the plus side in the Y direction. The distal end part of the convex portion 44 is in contact with the outer circumferential surface 21 of the rotor 2. Accordingly, the vibration of the vibrator 41 is transmitted to the rotor 2 via the convex portion 44. The alternating-current voltages applied to the first drive piezoelectric elements 7A, 7B and the second drive piezoelectric elements 7C, 7D, 7E, 7F are respectively adjusted, and thereby, expansion and contraction times are shifted and, as shown in FIG. 1, the rotor 2 may be rotated clockwise as shown by an arrow B1 and the rotor 2 may be rotated counterclockwise as shown by an arrow B2.

The urging member 5 is a member that urges the convex portion 44 toward the circumferential surface 21 of the rotor 2. The urging member 5 is fixed to a housing or the like with spring portions 513 provided in a base portion 51 supporting the piezoelectric actuator 4 flexed in the Y directions, and thereby, the convex portion 44 may be urged by the urging member 5 toward the circumferential surface 21 of the rotor 2 using a restoring force of the spring portions 513.

The controller 7 senses the vibration state of the vibrator 41 based on the detection signal output from the reference piezoelectric element 7G, adjusts voltage values of the alternating-current voltages and application times of the alternating-current voltages applied to the first drive piezoelectric elements 7A, 7B and the second drive piezoelectric elements 7C, 7D, 7E, 7F, and thereby, controls driving of the piezoelectric drive device 3.

According to the above described piezoelectric drive device 3, the concave portions 46 are placed side by side with the reference piezoelectric element 7G in the Z directions on the substrate 45, and thereby, the flexural vibration of the vibrator 41 becomes harder to be transmitted to the reference piezoelectric element 7G and the longitudinal vibration of the vibrator 41 may be accurately detected. Accordingly, the piezoelectric drive device 3 that can stably drive may be realized.

2. Second Embodiment

Next, a piezoelectric drive device 3a according to a second embodiment will be explained with reference to FIGS. 6 and 7.

The piezoelectric drive device 3*a* of the embodiment is the same as the piezoelectric drive device 3 of the first embodiment except that positions of concave portions 46*a* provided on a substrate 45*a* of a piezoelectric actuator 4*a* are different from those in the piezoelectric drive device 3 of the first embodiment. The embodiment will be explained with a focus on the differences from the above described first embodiment and the explanation of the same items will be omitted. In FIGS. 6 and 7, the same configurations as those of the above described embodiment have the same signs.

Figure 6:
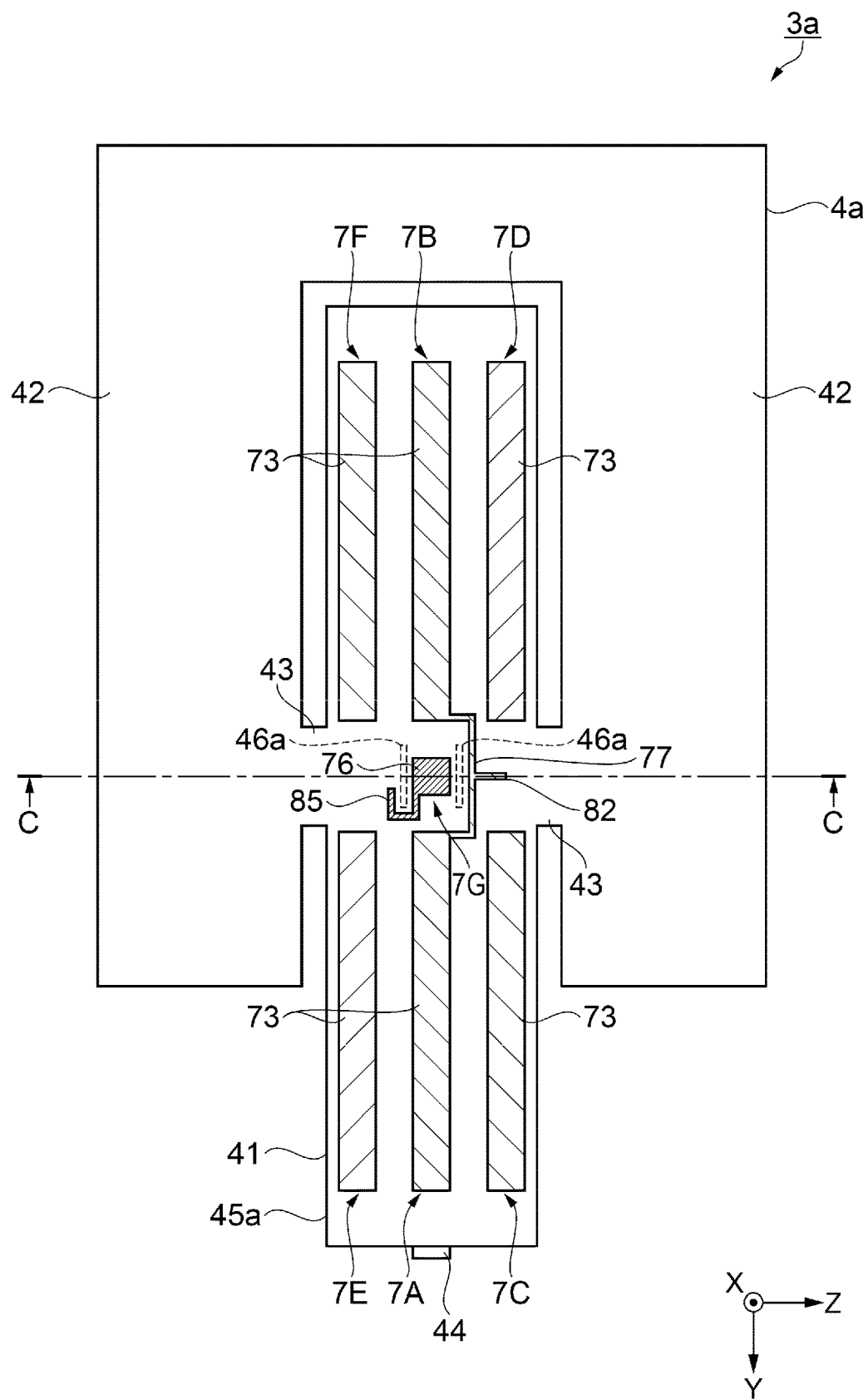
FIG. 6 is a plan view showing placement of electrodes in a piezoelectric drive device according to a second embodiment.
Figure 7:
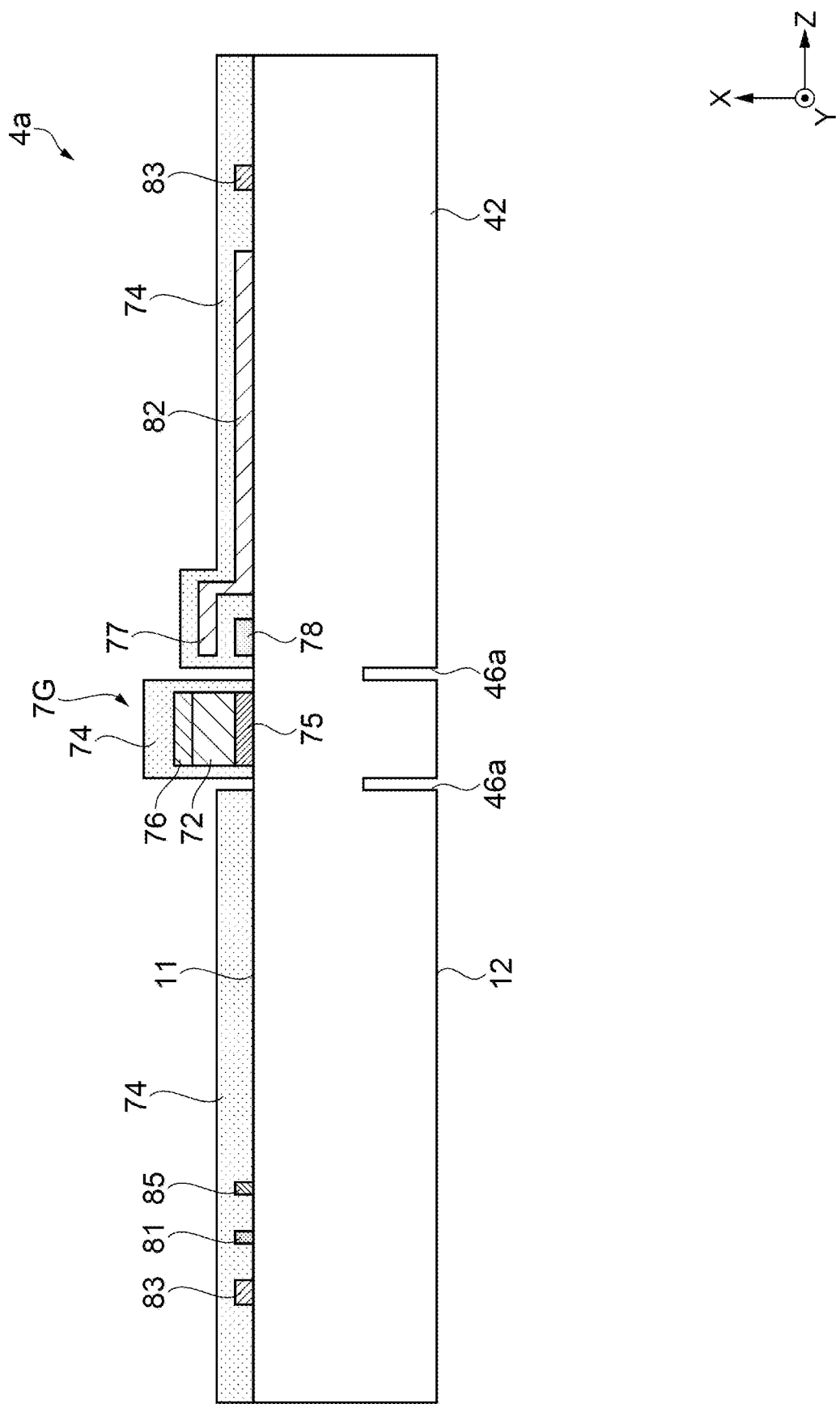
FIG. 7 is a sectional view along line C-C in FIG. 6.

In the piezoelectric drive device 3*a* of the embodiment, as shown in FIGS. 6 and 7, the concave portions 46*a* are provided on the second surface 12 as the opposite surface to the first surface 11 of the substrate 45*a* of the piezoelectric actuator 4*a* on which the reference piezoelectric element 7G is placed.

The concave portions 46*a* open to the second surface 12 side of the substrate 45*a* and have bottom surfaces at the first surface 11 side of the substrate 45*a*.

According to the configuration, the same effects as those of the above described first embodiment may be obtained. Further, compared with the first embodiment, the concave portions 46*a* are provided on the second surface 12 on which no elements or wires are placed, and thereby, the concave portions 46*a* may be formed in the substrate 45*a* more easily.

3. Third Embodiment

Next, a piezoelectric drive device 3*b* according to a third embodiment will be explained with reference to FIGS. 8 and 9.

The piezoelectric drive device 3*b* of the embodiment is the same as the piezoelectric drive device 3 of the first embodiment except that positions of a reference piezoelectric element 7Gb and concave portions 46*b* provided on a substrate 45*b* of a piezoelectric actuator 4*b* are different and a shape of a first drive piezoelectric element 7Ab is different from those in the piezoelectric drive device 3 of the first embodiment. The embodiment will be explained with a focus on the differences from the above described first embodiment and the explanation of the same items will be omitted. In FIGS. 8 and 9, the same configurations as those of the above described embodiment have the same signs.

Figure 8:
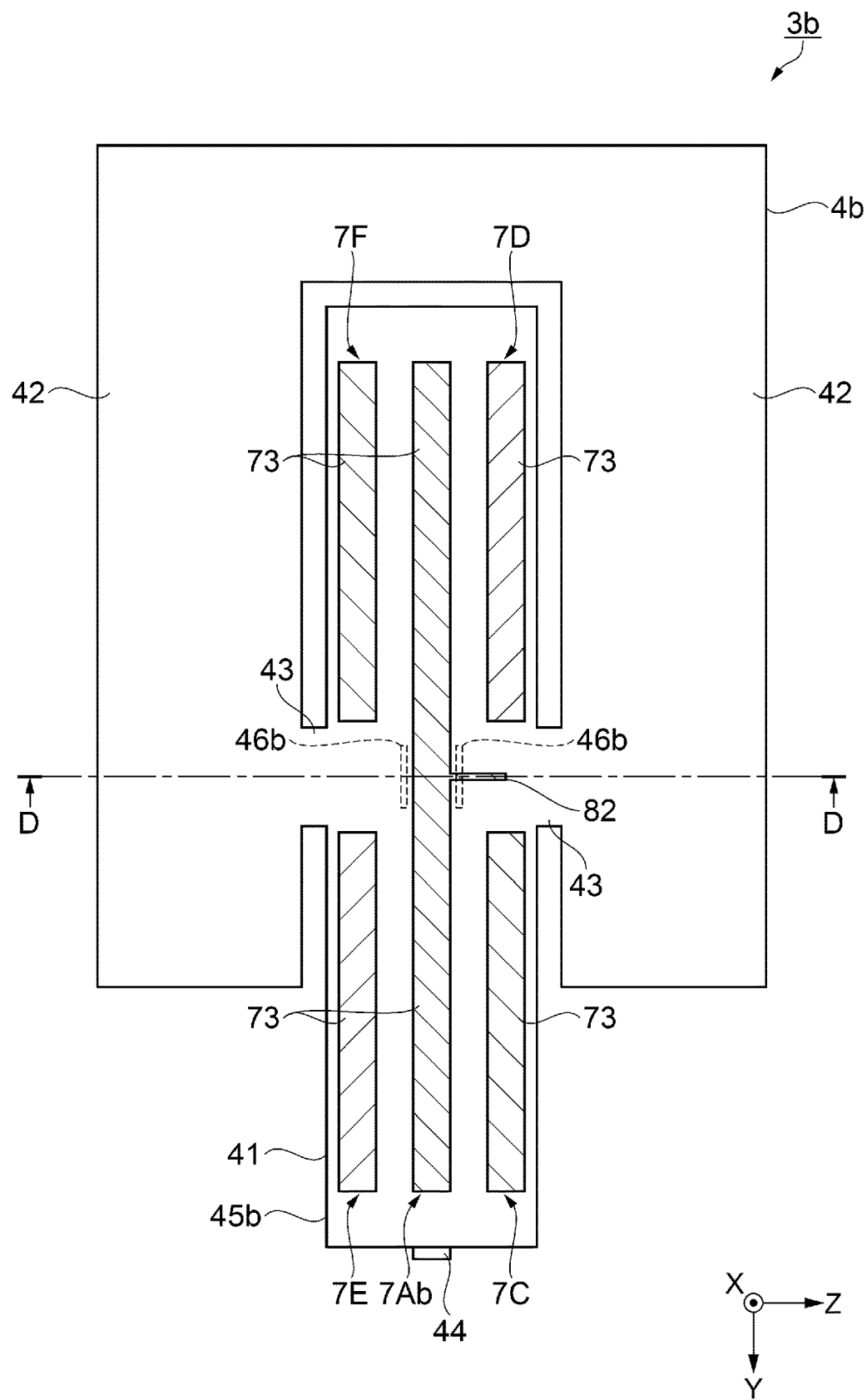
FIG. 8 is a plan view showing placement of electrodes in a piezoelectric drive device according to a third embodiment.
Figure 9:
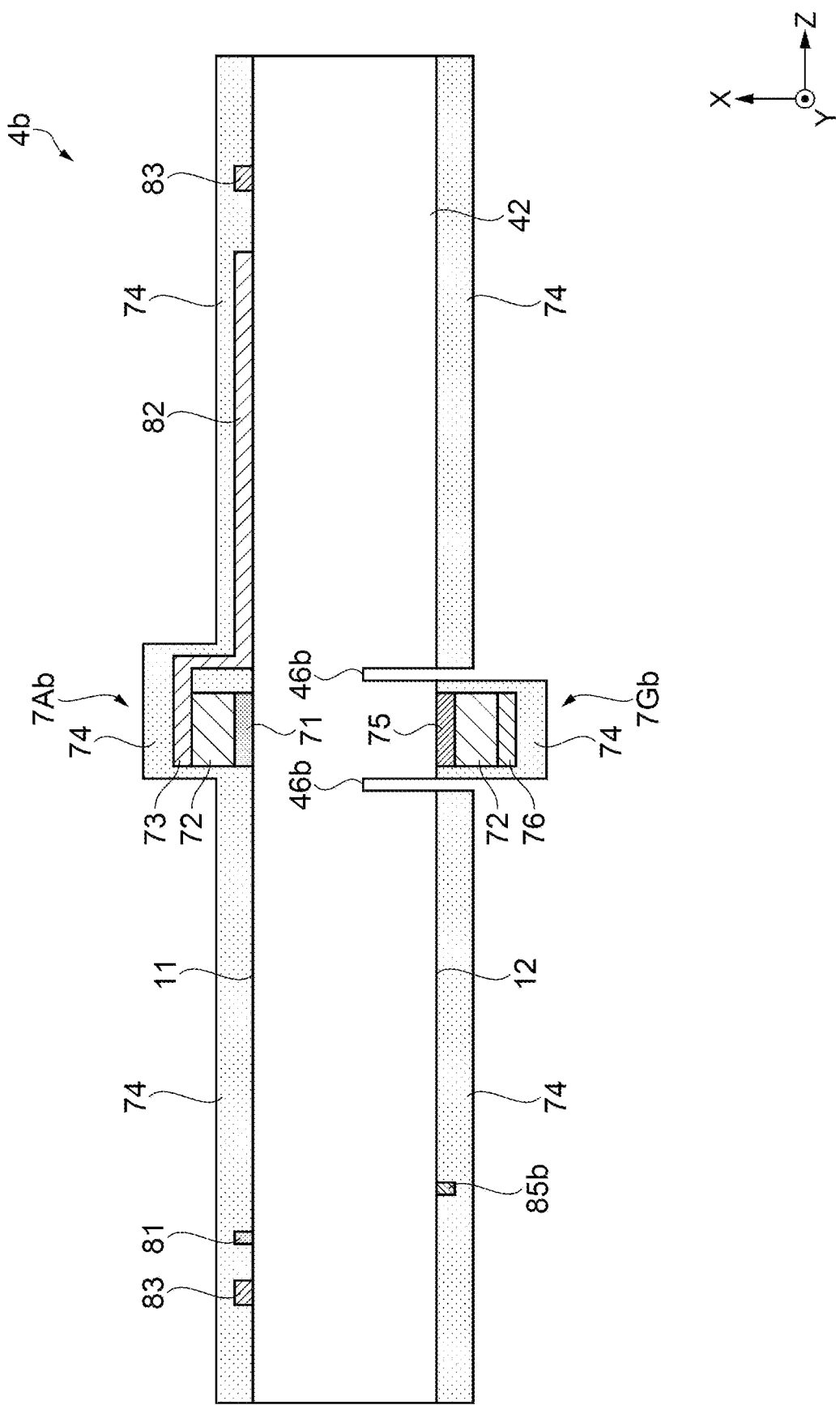
FIG. 9 is a sectional view along line D-D in FIG. 8.

In the piezoelectric drive device 3*b* of the embodiment, as shown in FIGS. 8 and 9, the reference piezoelectric element 7Gb and the concave portions 46*b* are provided on the second surface 12 opposite to the first surface 11 of the substrate 45*b* of the piezoelectric actuator 4*b* on which the first drive piezoelectric element 7Ab is placed. Further, a second detection wire 85*b* electrically coupling to the fourth electrode 76 of the reference piezoelectric element 7Gb and a first detection wire 84*b* (not shown) electrically coupling to the third electrode 75 of the reference piezoelectric element 7Gb are provided on the second surface 12.

Further, the first drive piezoelectric element 7Ab has a length in the Y directions from an end part at the plus side in the Y direction of the second drive piezoelectric element 7C to an end part at the minus side in the Y direction of the second drive piezoelectric element 7D and is placed to overlap with the reference piezoelectric element 7Gb in the plan view from the X direction.

According to the configuration, the same effects as those of the above described first embodiment may be obtained. Further, the reference piezoelectric element 7Gb is provided on the second surface 12, and thereby, the area of the first drive piezoelectric element 7Ab may be made larger than the areas of the first drive piezoelectric elements 7A, 7B of the first embodiment and amplitude in the Y directions of the longitudinal vibration of the substrate 45*b* may be made larger. Accordingly, drive performance of the piezoelectric drive device 3*b* may be improved.

4. Fourth Embodiment

Next, a piezoelectric drive device 3*c* according to a fourth embodiment will be explained with reference to FIGS. 10 and 11.

The piezoelectric drive device 3*c* of the embodiment is the same as the piezoelectric drive device 3 of the first embodiment except that positions of a reference piezoelectric element 7Gc and concave portions 46*c* provided on a substrate 45*c* of a piezoelectric actuator 4*c* are different and a shape of a first drive piezoelectric element 7Ac is different from those in the piezoelectric drive device 3 of the first embodiment. The embodiment will be explained with a focus on the differences from the above described first embodiment and the explanation of the same items will be omitted. In FIGS. 10 and 11, the same configurations as those of the above described embodiment have the same signs.

Figure 10:
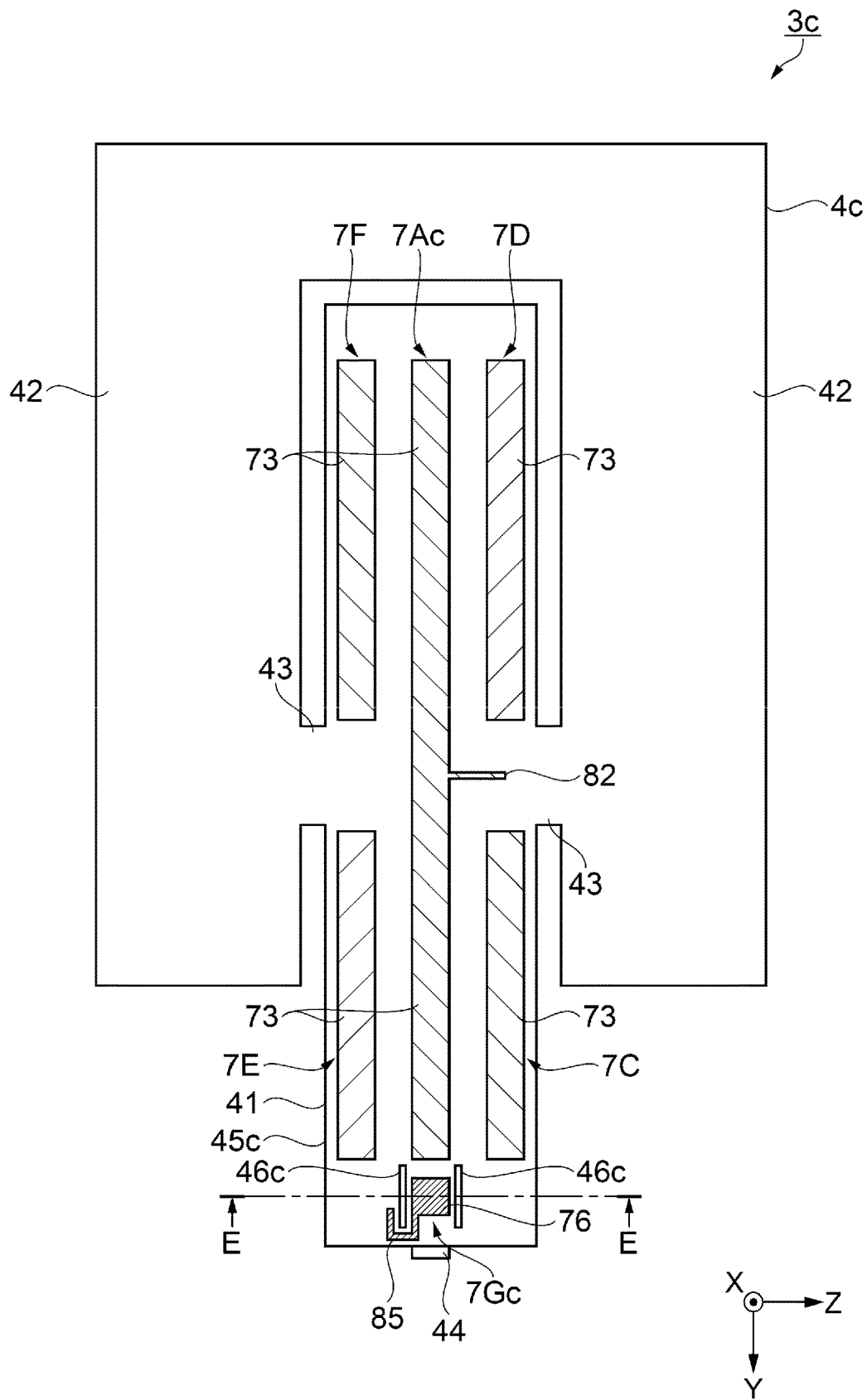
FIG. 10 is a plan view showing placement of electrodes in a piezoelectric drive device according to a fourth embodiment.
Figure 11:
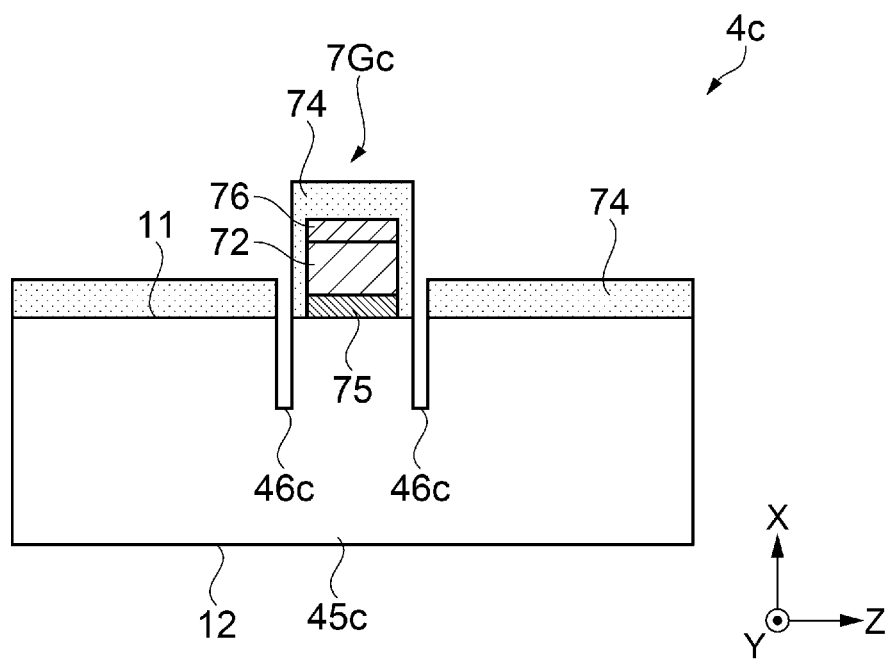
FIG. 11 is a sectional view along line E-E in FIG. 10.

In the piezoelectric drive device 3*c* of the embodiment, as shown in FIGS. 10 and 11, the reference piezoelectric element 7Gc and the concave portions 46*c* are provided side by side in the Y direction in positions not overlapping with the first drive piezoelectric element 7Ac at the plus side in the Y direction of the first drive piezoelectric element 7Ac in the plan view from the X direction on the first surface 11 of the substrate 45*c* of the piezoelectric actuator 4*c* on which the first drive piezoelectric element 7Ac is placed.

Further, the first drive piezoelectric element 7Ac has a length in the Y directions from an end part at the plus side in the Y direction of the second drive piezoelectric element 7C to an end part at the minus side in the Y direction of the second drive piezoelectric element 7D.

According to the configuration, the same effects as those of the above described first embodiment may be obtained. Further, the area of the first drive piezoelectric element 7Ac is larger than the areas of the first drive piezoelectric elements 7A, 7B of the first embodiment, and thereby, amplitude in the Y directions of the longitudinal vibration of the substrate 45*c* may be made larger and drive performance of the piezoelectric drive device 3*c* may be improved.

5. Fifth Embodiment

Next, a piezoelectric drive device 3*d* according to a fifth embodiment will be explained with reference to FIGS. 12 and 13.

The piezoelectric drive device 3*d* of the embodiment is the same as the piezoelectric drive device 3 of the first embodiment except that positions of a reference piezoelectric element 7Gd and a concave portion 46*d* provided on a substrate 45*d* of a piezoelectric actuator 4*d* are different and a shape of a first drive piezoelectric element 7Ad is different from those in the piezoelectric drive device 3 of the first embodiment. The embodiment will be explained with a focus on the differences from the above described first embodiment and the explanation of the same items will be omitted. In FIGS. 12 and 13, the same configurations as those of the above described embodiment have the same signs.

Figure 12:
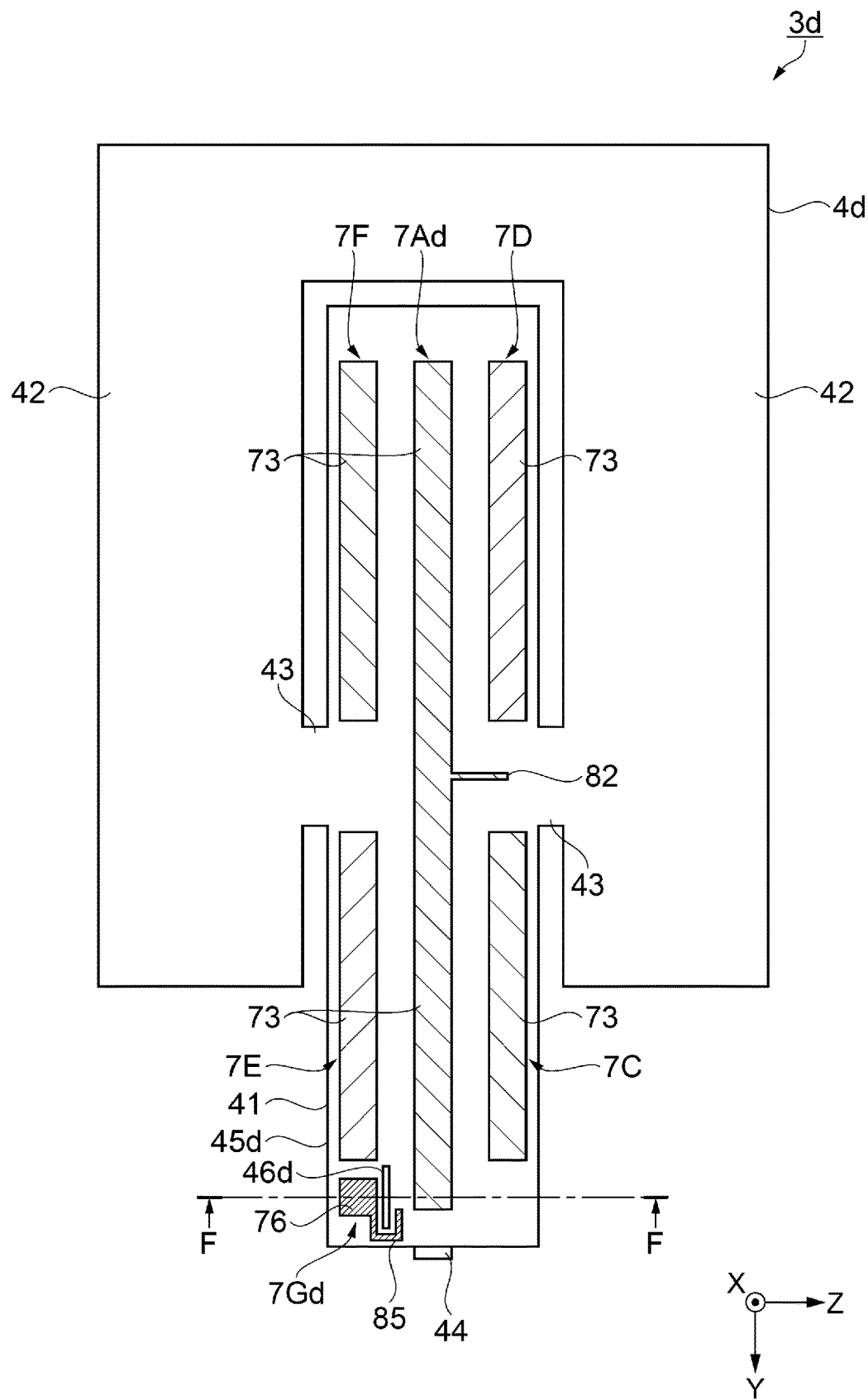
FIG. 12 is a plan view showing placement of electrodes in a piezoelectric drive device according to a fifth embodiment.
Figure 13:
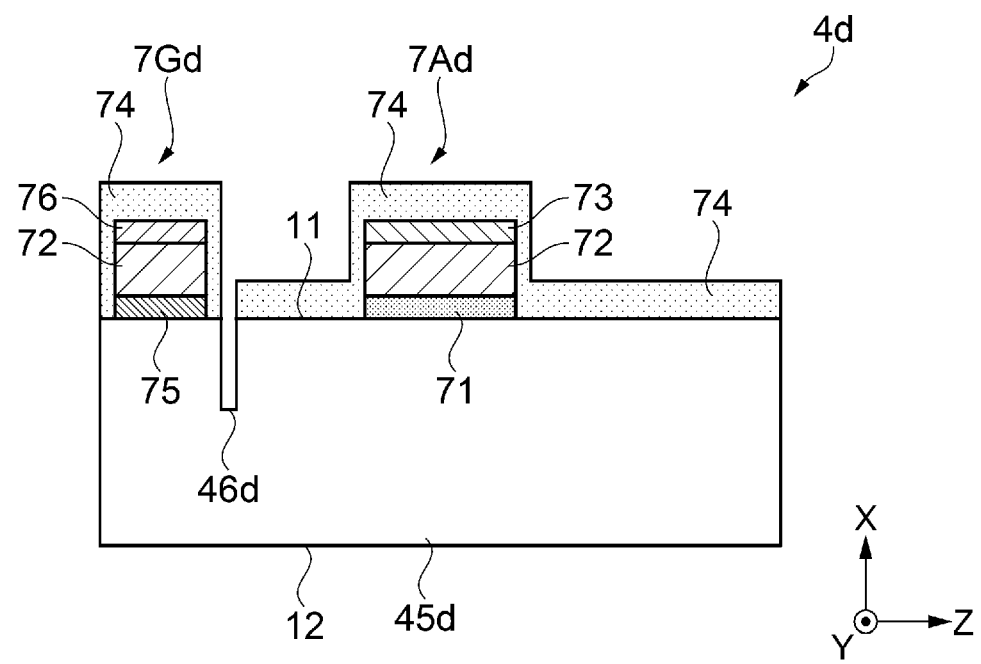
FIG. 13 is a sectional view along line F-F in FIG. 12.

In the piezoelectric drive device 3*d* of the embodiment, as shown in FIGS. 12 and 13, the reference piezoelectric element 7Gd and the concave portion 46*d* are provided in positions not overlapping with the first drive piezoelectric element 7Ad and the second drive piezoelectric element 7E at the plus side in the Y direction of the second drive piezoelectric element 7E in the plan view from the X direction on the first surface 11 of the substrate 45d of the piezoelectric actuator 4d on which the first drive piezoelectric element 7Ad and the second drive piezoelectric elements 7C, 7D, 7E, 7F are placed.

Further, the reference piezoelectric element 7Gd is placed adjacent to a side surface of the substrate 45d extending along the Y directions, and the concave portion 46d is placed at the opposite side to an end surface with respect to the reference piezoelectric element 7Gd.

Furthermore, the first drive piezoelectric element 7Ad has a length in the Y directions from between an end part at the plus side in the Y direction of the second drive piezoelectric element 7C and an end part at the plus side in the Y direction of the substrate 45d to an end part at the minus side in the Y direction of the second drive piezoelectric element 7D.

According to the configuration, the same effects as those of the above described first embodiment may be obtained. Further, the reference piezoelectric element 7Gd is placed adjacent to the side surface of the substrate 45d, and thereby, the area of the first drive piezoelectric element 7Ad may be made larger than the areas of the first drive piezoelectric elements 7A, 7B of the first embodiment, amplitude in the Y directions of the longitudinal vibration of the substrate 45d may be made larger. Accordingly, drive performance of the piezoelectric drive device 3d may be improved.

6. Sixth Embodiment

Next, a piezoelectric drive device 3e according to a sixth embodiment will be explained with reference to FIGS. 14 and 15.

The piezoelectric drive device 3e of the embodiment is the same as the piezoelectric drive device 3 of the first embodiment except that positions of reference piezoelectric elements 7Ge and concave portions 46e provided on a substrate 45e of a piezoelectric actuator 4e are different, the number of the reference piezoelectric elements 7Ge is different, and a shape of a first drive piezoelectric element 7Ae is different from those in the piezoelectric drive device 3 of the first embodiment. The embodiment will be explained with a focus on the differences from the above described first embodiment and the explanation of the same items will be omitted. In FIGS. 14 and 15, the same configurations as those of the above described embodiment have the same signs.

Figure 14:
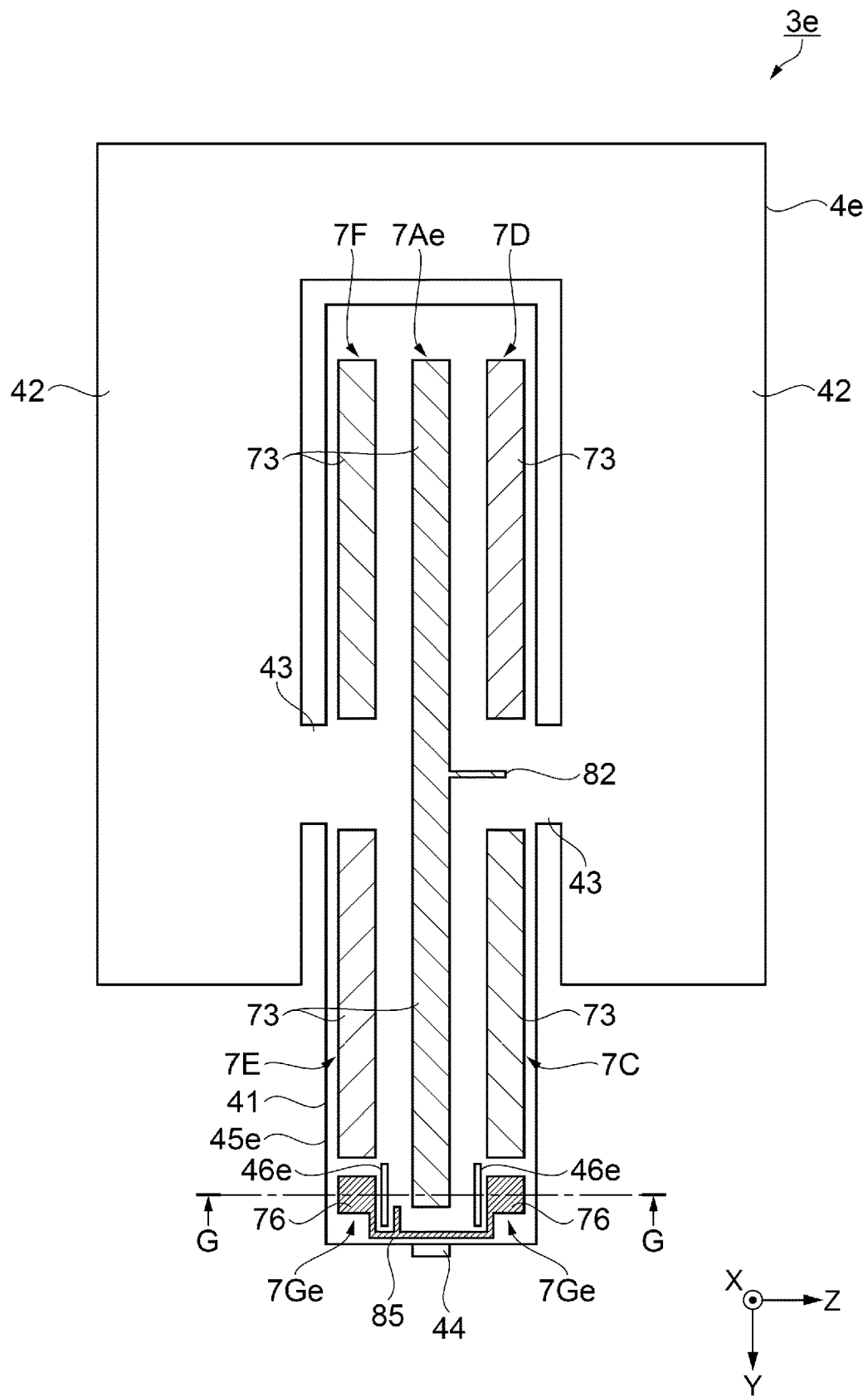
FIG. 14 is a plan view showing placement of electrodes in a piezoelectric drive device according to a sixth embodiment.
Figure 15:
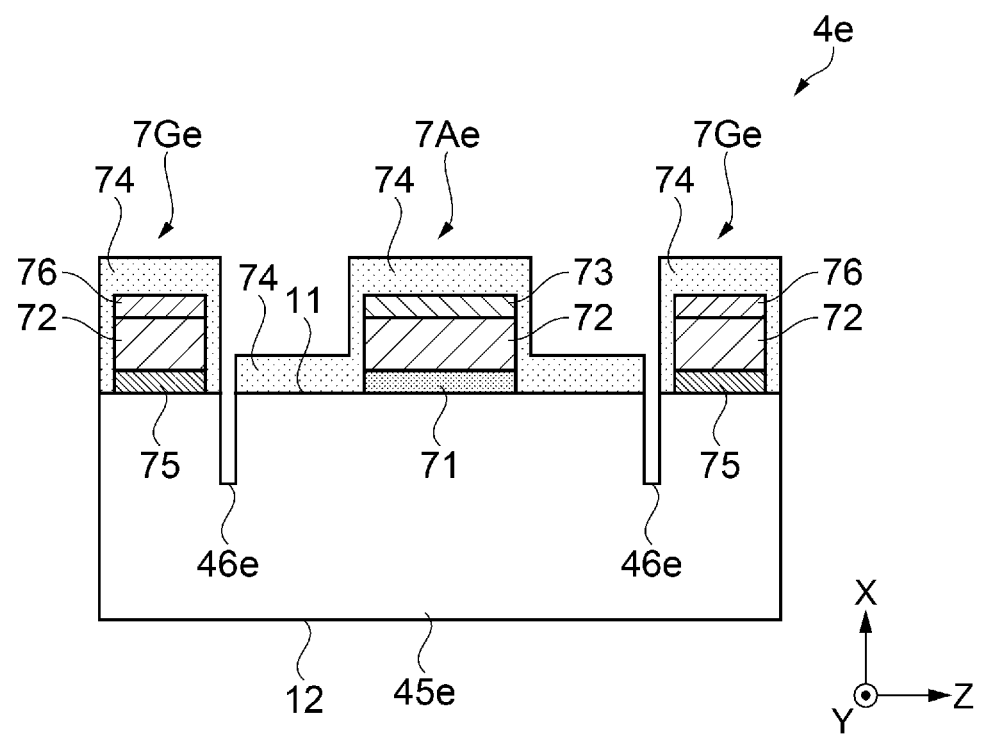
FIG. 15 is a sectional view along line G-G in FIG. 14.

In the piezoelectric drive device 3e of the embodiment, as shown in FIGS. 14 and 15, the two reference piezoelectric elements 7Ge and the two concave portions 46e are provided in positions not overlapping with the first drive piezoelectric element 7Ae, the second drive piezoelectric element 7C, or the second drive piezoelectric element 7E at the plus side in the Y direction of the second drive piezoelectric element 7C and the second drive piezoelectric element 7E in the plan view from the X direction on the first surface 11 of the substrate 45e of the piezoelectric actuator 4e on which the first drive piezoelectric element 7Ae etc. are placed.

Further, the reference piezoelectric elements 7Ge are placed adjacent to side surfaces on both sides of the substrate 45e extending along the Y directions, and the concave portions 46e are placed at the opposite sides to adjacent end surfaces with respect to the reference piezoelectric elements 7Ge.

Furthermore, the first drive piezoelectric element 7Ae has a length in the Y directions from between an end part at the plus side in the Y direction of the second drive piezoelectric element 7C and an end part at the plus side in the Y direction of the substrate 45e to an end part at the minus side in the Y direction of the second drive piezoelectric element 7D.

According to the configuration, the same effects as those of the above described first embodiment may be obtained. Further, the two reference piezoelectric elements 7Ge are placed adjacent to the side surfaces on both sides of the substrate 45e, and thereby, influences by the flexural vibrations may be cancelled out and the longitudinal vibration may be detected more accurately. Furthermore, the area of the first drive piezoelectric element 7Ae may be made larger than the areas of the first drive piezoelectric elements 7A, 7B of the first embodiment, amplitude in the Y directions of the longitudinal vibration of the substrate 45e may be made larger. Accordingly, drive performance of the piezoelectric drive device 3e may be improved.

7. Seventh Embodiment

Next, a piezoelectric drive device 3f according to a seventh embodiment will be explained with reference to FIGS. 16 and 17.

The piezoelectric drive device 3f of the embodiment is the same as the piezoelectric drive device 3 of the first embodiment except that shapes of concave portions 46f provided on a substrate 45f of a piezoelectric actuator 4f are different from those in the piezoelectric drive device 3 of the first embodiment. The embodiment will be explained with a focus on the differences from the above described first embodiment and the explanation of the same items will be omitted. In FIGS. 16 and 17, the same configurations as those of the above described embodiment have the same signs.

Figure 16:
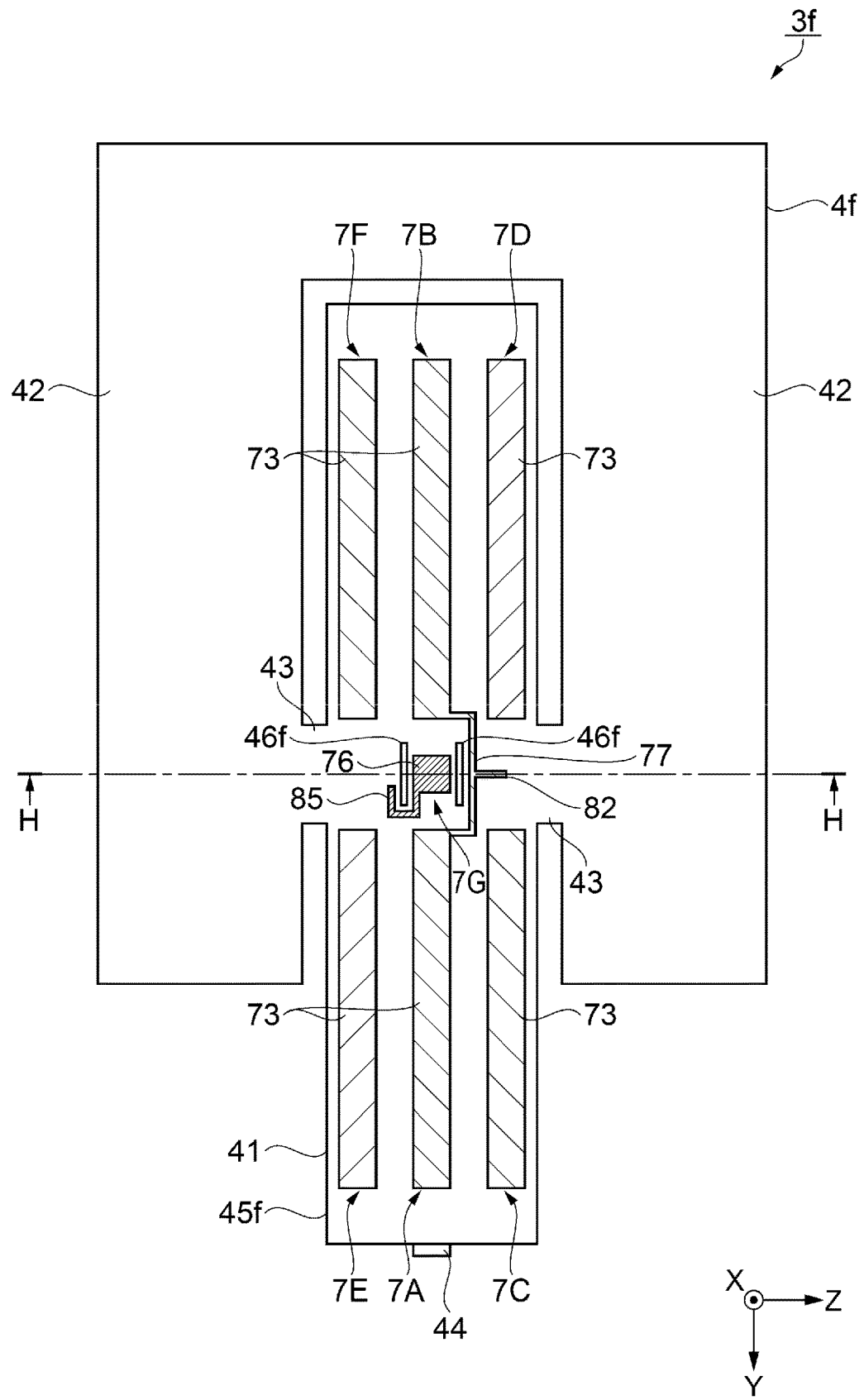
FIG. 16 is a plan view showing placement of electrodes in a piezoelectric drive device according to a seventh embodiment.
Figure 17:
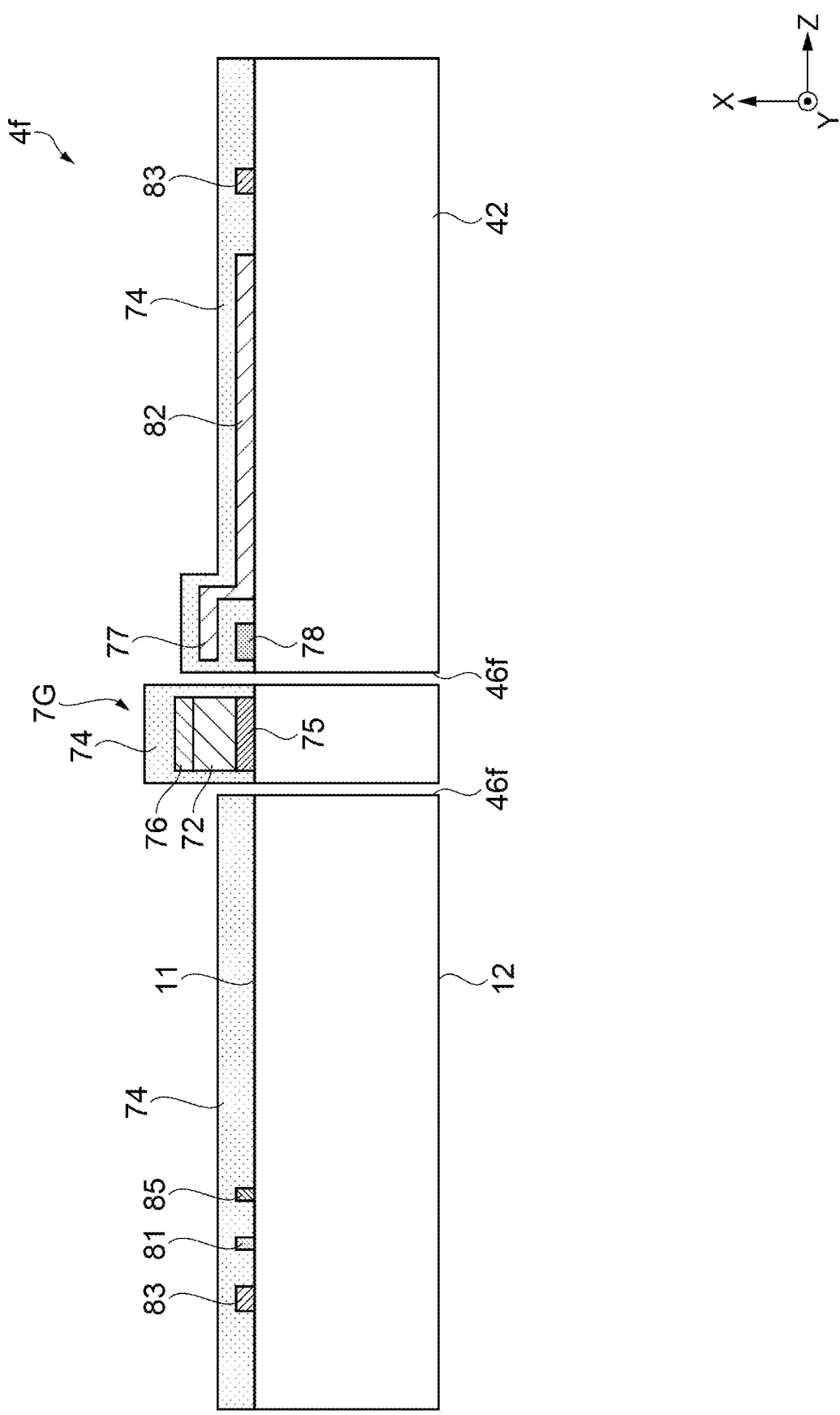
FIG. 17 is a sectional view along line H-H in FIG. 16.

In the piezoelectric drive device 3f of the embodiment, as shown in FIGS. 16 and 17, the concave portions 46f penetrating from the first surface 11 on which the reference piezoelectric element 7G is placed to the second surface 12 at the opposite side to the first surface 11 is provided on the substrate 45f of the piezoelectric actuator 4f.

According to the configuration, the same effects as those of the above described first embodiment may be obtained. Further, the concave portions 46f penetrate from the first surface 11 to the second surface 12 of the substrate 45f, and thereby, compared to the concave portions 46 of the first embodiment, depths are harder to be varied and formation of the concave portions 46f is easier.

8. Eighth Embodiment

Next, a robot 1000 including the piezoelectric drive device 3 to 3f according to an eighth embodiment will be explained with reference to FIG. 18. In the following description, a configuration to which the piezoelectric motor 1 including the piezoelectric drive device 3 is applied will be explained as an example.

Figure 18:
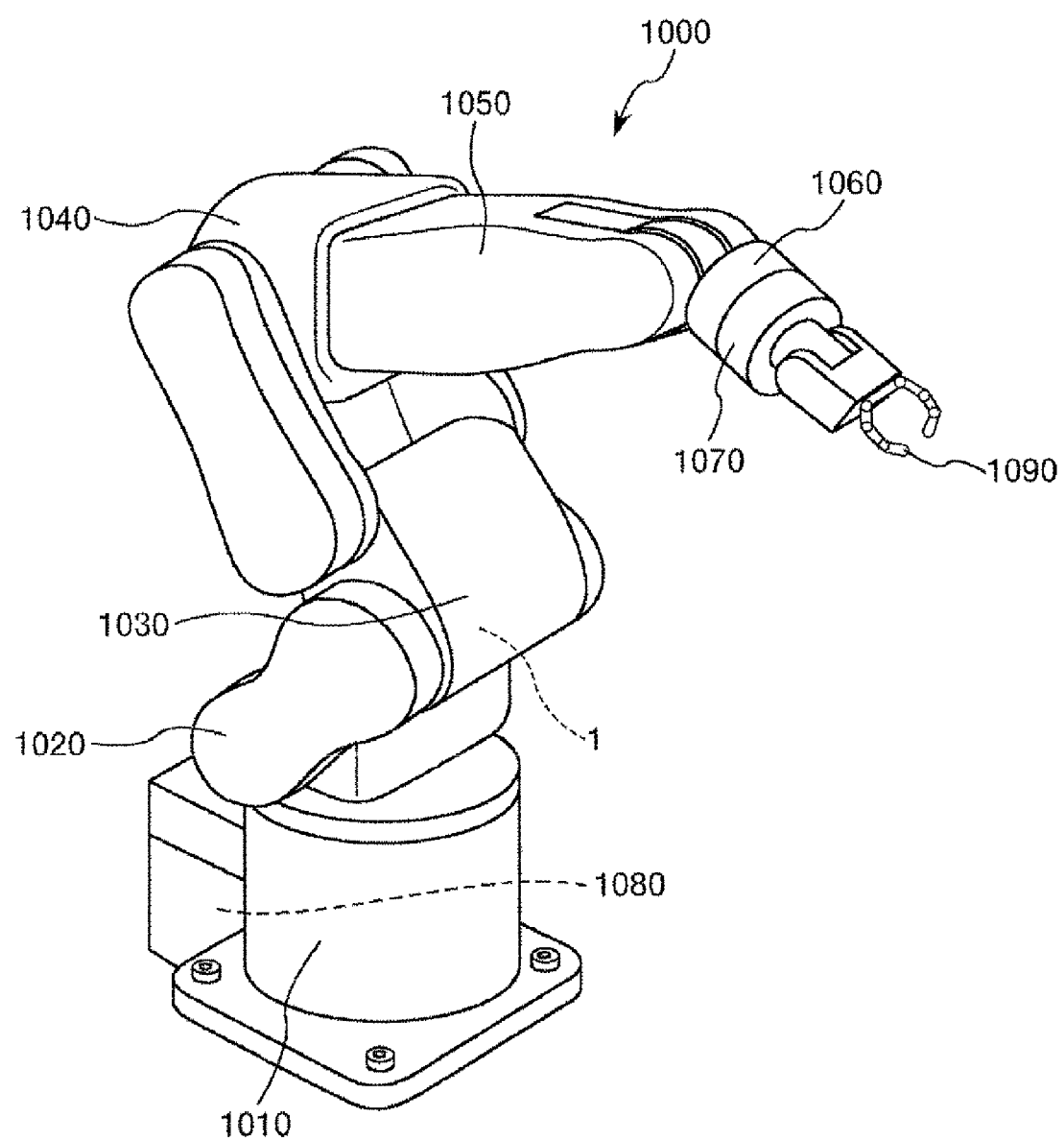
FIG. 18 is a perspective view showing a schematic configuration of a robot including a piezoelectric drive device according to an eighth embodiment.

As shown in FIG. 18, the robot 1000 may perform work of feeding, removing, transport, assembly, etc. of precision apparatuses and components forming the apparatuses. The robot 1000 is a six-axis robot and has a base 1010 fixed to a floor or a ceiling, an arm 1020 pivotably coupled to the base 1010, an arm 1030 pivotably coupled to the arm 1020, an arm 1040 pivotably coupled to the arm 1030, an arm 1050 pivotably coupled to the arm 1040, an arm 1060 pivotably coupled to the arm 1050, an arm 1070 pivotably coupled to the arm 1060, and a control apparatus 1080 that controls driving of these arms 1020, 1030, 1040, 1050, 1060, 1070.

Further, a hand coupling portion is provided in the arm 1070, and an end effector 1090 according to work to be executed by the robot 1000 is attached to the hand coupling portion. Furthermore, the piezoelectric motors 1 are provided in part or all of respective joint portions and the respective arms 1020, 1030, 1040, 1050, 1060, 1070 pivot by driving of the piezoelectric motors 1. Note that the piezoelectric motor 1 may be provided in the end effector 1090 and used for driving of the end effector 1090.

The control apparatus 1080 includes a computer having e.g. a processor (CPU), a memory, an I/F (interface), etc. The processor controls driving of the respective parts of the robot 1000 by executing a predetermined program stored in the memory. Note that the program may be downloaded from an external server via the I/F. Further, all or part of the configuration of the control apparatus 1080 may be provided outside of the robot 1000 and coupled via a communication network such as a LAN (local area network).

The robot 1000 includes the piezoelectric motor 1 as described above. That is, the robot 1000 has the piezoelectric drive device 3 including the piezoelectric actuator 4 and the controller 7 that controls the vibration of the piezoelectric actuator 4, and driving the rotor 2 in contact with the piezoelectric actuator 4 by vibrating the piezoelectric actuator 4. The piezoelectric actuator 4 includes the first drive piezoelectric elements 7A, 7B placed on the substrate 45 and longitudinally vibrating the substrate 45 in the Y directions, the second drive piezoelectric elements 7C, 7D, 7E, 7F flexurally vibrating the substrate 45 in the Z directions, and the reference piezoelectric element 7G receiving the longitudinal vibration and the flexural vibration and outputting the detection signal. The concave portions 46 are placed side by side with the reference piezoelectric element 7G in the Z directions, and thereby, the flexural vibration of the vibrator 41 becomes harder to be transmitted to the reference piezoelectric element 7G, the longitudinal vibration of the vibrator 41 may be accurately detected, and the vibration state of the vibrator 41 may be sensed more accurately. According to the robot 1000, in the piezoelectric drive device 3, the detection signal with higher accuracy may be acquired. Accordingly, the piezoelectric drive device 3 that can stably drive may be realized by driving based on the detection signal. As a result, the robot 1000 that can stably drive may be obtained.

What is claimed is:

1. A piezoelectric drive device comprising:
    a substrate;
    a convex portion coupling to the substrate and transmitting drive power to a driven member;
    a first drive piezoelectric element placed on the substrate and vibrating the substrate in first directions in which the substrate and the convex portion are arranged;
    a second drive piezoelectric element placed on the substrate and vibrating the substrate in second directions orthogonal to the first directions;
    a reference piezoelectric element placed on the substrate, receiving the vibration in the first directions, and outputting a detection signal; and
    a concave portion placed side by side with the reference piezoelectric element in the second directions in a plan view from a third direction orthogonal to the first directions and the second directions.

2. The piezoelectric drive device according to claim 1, wherein
    a plurality of the concave portions are provided, and
    the reference piezoelectric element is placed between the plurality of concave portions in the plan view.

3. The piezoelectric drive device according to claim 1, wherein
    the concave portion is placed on a surface of the substrate on which the reference piezoelectric element is placed.

4. The piezoelectric drive device according to claim 1, wherein
    the concave portion is placed on a surface opposite to a surface of the substrate on which the reference piezoelectric element is placed.

5. The piezoelectric drive device according to claim 1, wherein
    the reference piezoelectric element is placed on a surface opposite to a surface of the substrate on which the first drive piezoelectric element is placed.

6. The piezoelectric drive device according to claim 1, wherein
    the first drive piezoelectric element and the reference piezoelectric element are placed side by side in the first directions in the plan view.

7. The piezoelectric drive device according to claim 1, wherein
    the reference piezoelectric element is placed adjacent to an end surface of the substrate extending along the first directions, and
    the concave portion is placed at an opposite side to the end surface with respect to the reference piezoelectric element.

8. The piezoelectric drive device according to claim 1, wherein
    the substrate is silicon.

9. The piezoelectric drive device according to claim 1, wherein
    the concave portion penetrates the substrate.

10. A robot comprising a piezoelectric motor having the piezoelectric drive device according to claim 1.

* * * * *